No. 890,017. PATENTED JUNE 9, 1908.
E. J. B. BUCKLE.
SAFETY PROTECTOR FOR ANGLERS' BAIT, HOOKS, LURES, OR THE LIKE.
APPLICATION FILED NOV. 26, 1906.
FIG. I.
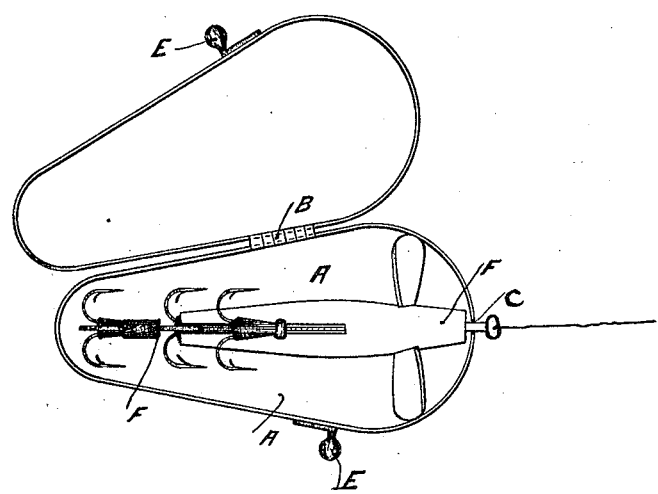
FIG. II.
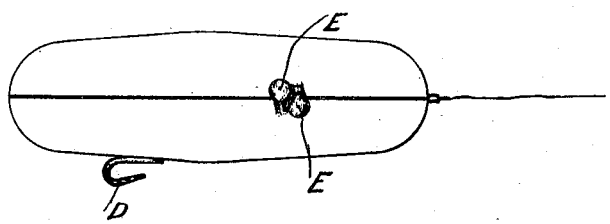
Witnesses
Inventor
Edward John Bentley Buckle

UNITED STATES PATENT OFFICE.

EDWARD JOHN BENTLEY BUCKLE, OF WHITBY, ENGLAND.

SAFETY-PROTECTOR FOR ANGLERS' BAIT, HOOKS, LURES, OR THE LIKE.

No. 890,017.  Specification of Letters Patent.  Patented June 9, 1908.

Application filed November 26, 1906. Serial No. 345,197.

*To all whom it may concern:*

Be it known that I, EDWARD JOHN BENTLEY BUCKLE, a subject of Great Britain, residing at Elford, Whitby, England, major, (retired,) have invented a new or Improved Safety-Protector for Anglers' Bait, Hooks, Lures, or the Like, of which the following is a specification.

This invention relates to a new or improved safety protector for anglers' bait, hooks, lures, or the like, and has for its object to provide, in a simple, convenient, and inexpensive form, a cover or protector which the angler can, at will, readily place upon or take from the hook or hooks while angling, thus enabling him to protect himself from accidentally fouling the hook or flight at times when he is not in the act of fishing, and also to maintain the lure, at such times, in its proper position on the flight.

To the end in view, the said safety protector comprises essentially a suitably shaped and constructed case or box forming a covering or envelop which is capable of being closed and opened at will.

In order that the said invention may be more readily understood reference should be made to the accompanying drawing in which Figure 1 is a plan view illustrating the safety protector opened, and Fig. 2 a side elevation showing it closed.

According to my invention I provide a case or box A made of metal or other sufficiently durable material, generally oval and convex in shape externally and divided longitudinally, but united at one side by hinge or hinges B, and having a fastening, which may be in the form of a clasp E on the opposite side, thus forming an elongated case or box, the upper part of which is a lid.

Internally the case or box A is hollowed or concave, both in the upper part and also in the lower part. The lower part of the case or box A has at one extremity of it a circular aperture C, a segment of which is cut by the rim of the case or box. This circular aperture C is of dimensions sufficient to easily contain the mouth or front portion of an artificial, or dead bait, lure, or flight F, or, in the case of a "prawn" bait, the tail of the prawn, or the breadth and thickness of the gimp, gut, trace, or line of an angler's hook or hooks, flight, bait or lure, according to the lure used, after the rim of the top part of the case or box has been closed upon the rim of the lower part. The case or box A is also provided, on the outside of its lower part, with a blunted hook D by which it can be suspended or attached to the reel or rings of the angler's rod.

In use, the case or box is opened and the angler's hook or hooks, dead bait, flight, artificial minnow, bait or lure, can be placed therein; the gimp, gut, and the like attached to the lure running through the circular aperture at the end of the case or box, and the lid can then be closed upon the lure which is thereby protected.

When the lure is required for angling the case or box is opened and the lure is released.

It will be obvious that the size and exact general shape of the case or box, constituting the safety protector, is governed by the size and shape of the lure, which it is to protect.

I claim

A safety protector for anglers' bait, hooks, lures, or the like, comprising a case or box A hinged at one side and provided with a clasp E, at the other side, for fastening the case or box when closed, said box having a circular aperture C, formed at one end thereof, for allowing a passage therethrough for the bait, gimp, gut or the like to project therefrom, and a blunted hook D secured, towards the other end, on the outside of the lower part of said case or box, by which it can be suspended or attached to the reel or rings of an angler's rod, all in combination as shown and described.

EDWARD JOHN BENTLEY BUCKLE.

Witnesses:
M. DIXON,
H. M. PEASEGOROD.